(12) United States Patent
Andres Del Valle et al.

(10) Patent No.: US 8,737,804 B2
(45) Date of Patent: May 27, 2014

(54) SYSTEM FOR DELAYED VIDEO VIEWING

(75) Inventors: Ana Cristina Andres Del Valle, Juan les Pins (FR); Kelly L. Dempski, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 13 days.

(21) Appl. No.: 13/241,719

(22) Filed: Sep. 23, 2011

(65) Prior Publication Data

US 2012/0082427 A1   Apr. 5, 2012

(30) Foreign Application Priority Data

Oct. 4, 2010   (EP) .................................... 10306081

(51) Int. Cl.
    *H04N 5/77*   (2006.01)
(52) U.S. Cl.
    USPC ...................................................... 386/229
(58) Field of Classification Search
    None
    See application file for complete search history.

(56) References Cited

U.S. PATENT DOCUMENTS

2012/0082424 A1* 4/2012 Hubner et al. ................ 386/219

OTHER PUBLICATIONS

European Search Report issued in Application Ser. No. EP10306081 on Dec. 14, 2010.

Liu, X., et al., "SEVA: Sensor-enhanced Video Annotation", ACM Translations on Multimedia Computing, Communications and Appications Aug. 1, 2009, Assocaition for Computing Machinery USA, vol. 5, No. 3.
England, P., et al.: "RAVE: Real-time Serivces for the Web", Computer Networks and ISDN Systems, North Holland Publishing, Amsterdam, NL, vol. 28, No. 11, May 1, 1996.
Wai Yat Wong, et al., "Web Based Educational Video Teaching and Learning Platform with Collaborative Annotation", Advanced Learning Technologies, 2009, ICALT 2009, Ninth IEEE International Conference, IEEE Piscataway, NJ Jul. 15, 2009, pp. 696-700.
Hironori, Egi, et al., "Designing a Peer Reviewing Tool on Lecture Video with Handwritten Annotation", Human Interface and the Management of Information. Designing Information Environments, Springer Berlin Heidelberg, vol. 5617, Jul. 19, 2009, pp. 31-39.
Shoko Wakamiya, et al., "Scene Extraction for Video Clips Based on the Relation of Text, Pointing Region and Temporal Duration of User Comments", Database and Expert Systems Application, 2009, Dexa '09, 20th International Workshop on, IEEE, Piscataway, NJ, Aug. 31, 2009, pp. 289-294.
Baldo, N., et al., "RTCP feedback based transmission rate control for 3G wireless multimedia streaming", Personal, Indoor and Mobile Radio Communications, 2004, PIMRC 2004, 15th IEEE International Symposium, Barcelona, Spain, Sep. 5, 2004, IEEE, Piscataway, NJ vol. 3, pp. 1817-1821.

(Continued)

*Primary Examiner* — William C Vaughn, Jr.
*Assistant Examiner* — Daniel Tekle
(74) *Attorney, Agent, or Firm* — Harrity & Harrity, LLP

(57) ABSTRACT

The disclosure concerns methods of playback of a video stream comprising: receiving from a first user device first media content associated with said video stream; associating with said first media content a time stamp indicating the time at which said first media content is received with respect to a reference time associated with said video stream; and during delayed playback of said video stream on a second user device, transmitting, at the time indicated by said time stamp, said first media content for display by said second user device.

20 Claims, 3 Drawing Sheets

(56) References Cited

OTHER PUBLICATIONS

Jinyong, Jo, et al., "Evaluation on the performance of adaptive playout for the multicast streaming of stored media", New Frontiers in Telecommunications: 2003, IEEE International Conference on Communications, ICC 2003; May 11-15, 2003, Anchorage, Alaska, IEEE Operations Center, Piscataway, NJ vol. 1, May 11, 2003, pp. 542-546.

Calder, B.R., et al., "Ultraprecise Absolute Time Synchronization for Distributed Acquisition Systems", IEEE Journal of Oceanic Engineering, IEEE Service Center, Piscataway, NJ, vol. 32, No. 4, Oct. 1, 2007, pp. 772-785.

Olivier Avaro, et al., "MPEG-7 Systems: Overview", IEEE Transactions on Circuits and Systems for Video Technology, IEEE Service Center, Piscataway, NJ, vol. 11, No. 6, Jun. 1, 2001.

* cited by examiner

SYSTEM FOR DELAYED VIDEO VIEWING

FIELD

The present disclosure relates to methods and systems for delayed playback of a video stream.

BACKGROUND

Social networking websites such as Facebook, and Twitter (the names "Facebook" and "Twitter" are likely to correspond to registered trademarks) now allow users the possibility of posting comments or other types of media on a wide range of topics. Furthermore, video sharing websites such as Youtube (the name "Youtube" is also likely to correspond to a registered trademark) allow users to post comments regarding videos that are available on the site.

It would be desirable to be able to allow such items of media content to be made available to users for a wide range of video transmissions, and in particular during delayed viewing, for example in video on demand or hard disk viewing systems.

Specifically, there is a need for methods and systems for better controlling the distribution of media content in relation to video streams, in particular when video streams are played back a certain time delay after an initial transmission of the video stream.

SUMMARY

It is an aim of embodiments of the present disclosure to at least partially address one or more difficulties in the prior art.

According to one aspect of the present disclosure, there is provided a method of playback of a video stream comprising: receiving from a first user device first media content associated with said video stream; associating with said first media content a time stamp indicating the time at which said first media content is received with respect to a reference time associated with said video stream; and during delayed playback of said video stream on a second user device, transmitting, at the time indicated by said time stamp, said first media content for display by said second user device.

According to one embodiment, said first media content is submitted by a user during playback of said video stream on said first user device.

According to another embodiment, said first media content relates to a live event, and wherein said video stream is a video recording of said live event.

According to another embodiment, the method further comprises receiving a control signal from said second user device indicating the playback status of said video stream.

According to another embodiment, said delayed playback of said video stream is displayed on a display of said second user device different to a display used for displaying said first media content.

According to another embodiment, said delayed playback of said video stream is displayed on the same display of said second user device as the one used for displaying said first media content.

According to another embodiment, the method further comprises identifying said video stream with which said first media content is associated.

According to another embodiment, identifying said video stream is based on location data of said first user device.

According to another embodiment, said media content is at least one of: one or more comments entered via an input module of said first user device; one or more images captured by said first user device; and one or more sounds captured by said first user device.

According to another embodiment, said media content is a comment entered on a social networking website via said first user device.

According to a further aspect of the present disclosure, there is provided a content server comprising: an input interface for receiving from a first user device first media content associated with said video stream; a processor arranged to associate with said first media content a time stamp indicating the time at which said first media content is received with respect to a reference time associated with said video stream; and an output interface arranged to transmit, at the time indicated by said time stamp during delayed playback of said video stream on a second user device, said first media content for display by said second user device.

According to a further aspect of the present disclosure, there is provided a system for delayed playback of a video stream comprising: a first user device for capturing first media content; a second user device for displaying said delayed playback of said video stream; and the above content server.

BRIEF DESCRIPTION OF THE DRAWINGS

The foregoing and other purposes, features and aspects of the disclosure will become apparent from the following detailed description of embodiments, given by way of illustration and not limitation with reference to the accompanying drawings, in which.

Throughout the figures, like features have been labelled with like reference numerals.

DETAILED DESCRIPTION OF EMBODIMENTS

Throughout the following description, only those elements useful for an understanding of the disclosure have been described in detail. Other details, such as the type of video broadcast systems involved, have not been described, the disclosed systems and methods being applicable to any type of video transmission, such as an ADSL (Advanced Digital Subscriber Line), cable, digital terrestrial or satellite broadcasts etc.

Furthermore, throughout the present application, the following terms are assigned the following definitions:
  media content—any text, image, video and/or sound in electronic format;
  feed—media content that is automatically pushed or pulled to a user, a check for new content being performed on a regular basis, such as every few minutes;
  social network site—any Internet site allowing members to post comments or other media content to be viewed by their friends;
  video stream—any video transmission, such as a television program, film, or online video.

Figure 1:
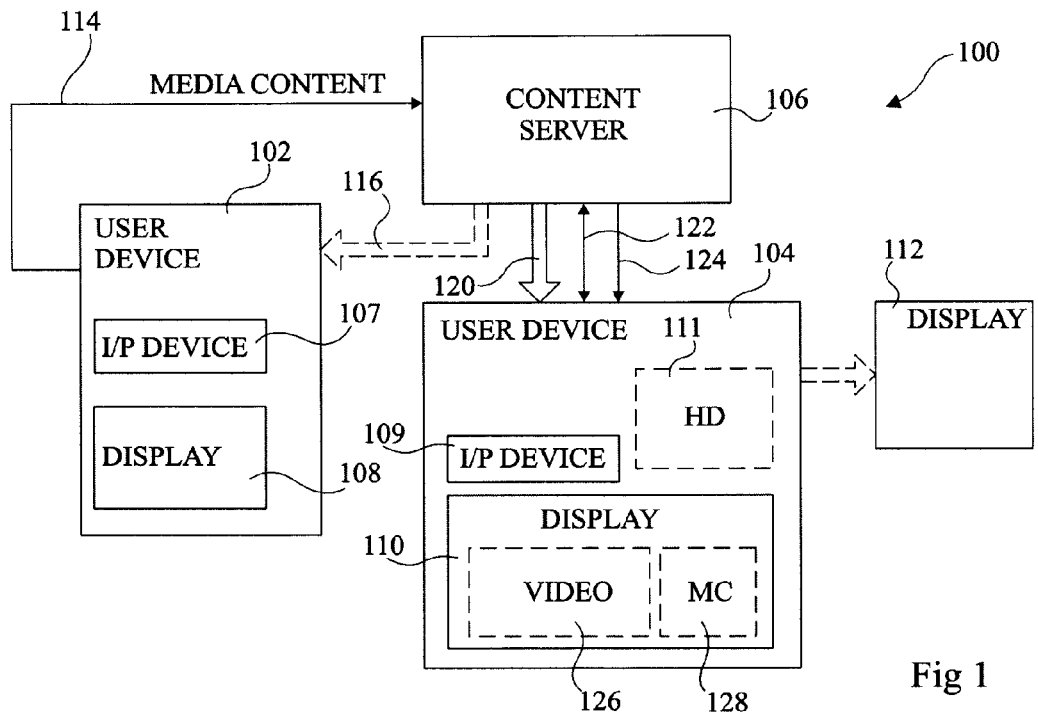
FIG. 1 illustrates a delayed video viewing system according to an embodiment of the present disclosure.

FIG. 1 illustrates a delayed video viewing system 100, comprising user devices 102 and 104, each associated with a different user. The user devices 102, 104 could be PCs or laptop computers, mobile telephones, or other types of communications devices capable of communication with a remote content server 106.

The user device 102 for example comprises a built-in input device 107 and a built-in display 108. Similarly, user device 104 comprises a built-in input device 109 and a built-in display 110. Optionally, user device 104 may comprise a built-in hard-disk drive 111 and/or an external display 112. In alternative embodiments one or both of the built-in displays 108, 110 could be touch screens that function as input devices. Furthermore, additionally or alternatively one or more external input devices and/or displays could be coupled to the user devices 102 or 104.

A user of the user device 102 for example generates media content associated with a video stream. For example, either the user of the user device 102 is viewing the video stream, or the user is viewing a live event that is being recorded to generate a video stream. The media content is transmitted to the content server 106 via a communications path 114, which for example comprises a connection over the internet. The media content could be a comment, image, video or sound clip inputted by the user, for example via the input device 107. Optionally, a communications path 116 may also exist between the content server 106 and the user device 102 for the transmission of video to device 102. User device 104 may be capable of delayed viewing of video streams along with associated media content provided by content server 106.

While only two user devices have been illustrated, naturally the system 100 may comprise additional devices 102 via which media content may be submitted in relation to a video stream, and additional devices 104 capable of delayed viewing of video streams with the media content.

The content server 106 supplies video and media content for delayed viewing by the user device 104. For example, the content server 106 could form part of the equipment of a cable, ADSL or satellite provider, capable of transmitting television programs and/or video on demand. For example, a communication path 120 provides a main video transmission channel over which a video may be transmitted. The video may be transmitted at scheduled transmission times, the hard-disk 111 of the user device 104 being used to store one or more video streams received via the communications path 120 for delayed viewing. Alternatively or additionally, the content server 106 may be able to provide video on demand to the user device 104 via the communications path 120.

A communications path 122 provides control information between the content server 106 and the user device 104, which for example indicates video streaming information such as the television channel or video that is desired to be viewed, playback commands for the video, such as pause, play, fast-forward, rewind etc., and/or information regarding the current runtime of the video stream. For example, such control signals on path 122 could correspond to the Real-time streaming protocol (RTSP), and video could be streamed over the communications path 120 according to the real-time transport protocol (RTP).

A communications path 124 provides the media content from the content server 106 to the user device 104 as a feed, which is displayed either on a same display as the video stream, or on a separate display. For example, the built-in display 110 of device 104 could display, in a window 126, the video stream from the content server 106 received via communications path 120, and in a window 128, the media content received via the communication path 124. Alternatively, the display 110 could display only the media content, the video being displayed on the external display 112.

The content server 106 is for example arranged to provide the media content 114 generated by user device 102 to the user device 104 during delayed viewing of a corresponding video stream. In particular, when the new media content is received by the content server 106, the content server 106 for example generates a time stamp which is associated with the media content. To synchronize the user viewing and the generation of content, a single reference time may be used, provided by the server. However, transmission mechanisms between the user device 102 and the content server 106 are likely to introduce delays between the moment that a user submits an item of media content, and the time it is received by the server. Preferably this transmission delay is estimated by the content server 106 and taken into account when generating the time stamp. The time stamp may indicate a time instant in the video stream corresponding to time at which the media content is received. This time stamp may be referenced against a reference time associated with the viewing by the user of device 102. Then, during delayed playback of the video stream on device 104, the content server 106 may use the time stamp to synchronize feeds with the delayed video stream, as will now be described in more detail with reference to FIG. 2.

Figure 2:
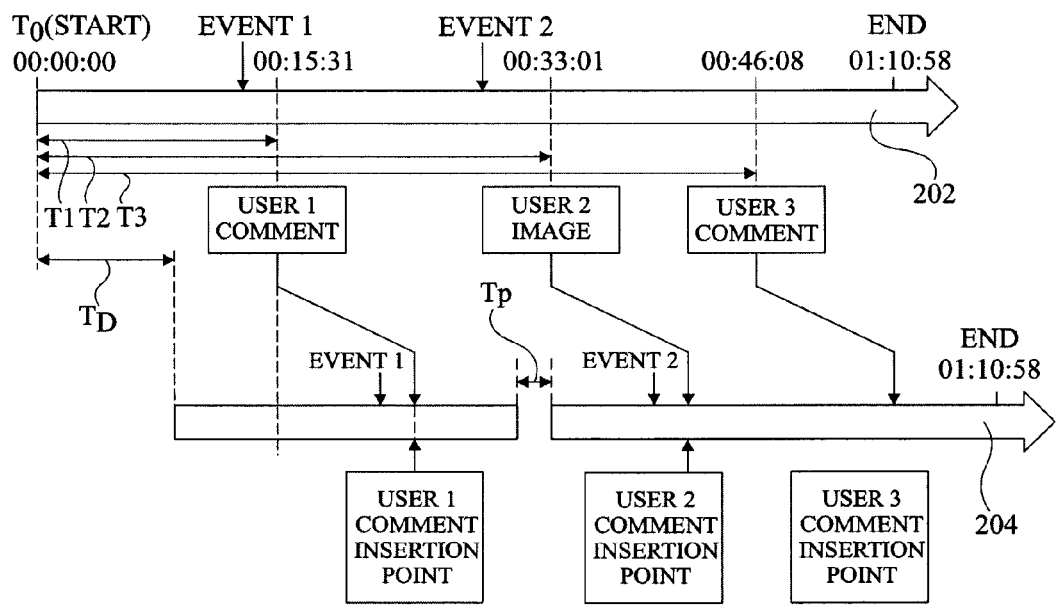
FIG. 2 represents video streams for illustrating a principle behind embodiments of the present disclosure.

FIG. 2 illustrates a video stream 202, and a delayed version 204 of the video stream. A reference time $T_0$ is defined, in this example at the start time of the video stream, which is at time 00:00:00 (hrs:mins:secs). Alternatively, in the case that the user of device 102 is attending a live event, such as a football match or concert, the reference time $T_0$ could instead correspond to a known time reference during the event, such as the blowing of a referee's whistle at the start of a football match, or the first chord of a first song at a concert.

A time period $T_1$ after the reference time $T_0$, a first user USER1 submits media content in the form of a comment, which is received by the content server. USER1 for example corresponds to the user of device 102 of FIG. 1. The comment is for example in response to an event EVENT1 captured in the video stream a short time before the comment is submitted. For example, EVENT1 could be a goal in a football match, and the user's comment is "Great goal!!". Alternatively, EVENT1 could be the end of a song at a concert, or a key scene in a movie. A time stamp is generated for the USER1 comment by the content server 106, and indicates the time delay between the reference time $T_0$ and the reception of the media content. In this example, this time delay is $T_1$, equal to 00:15:31, in other words 15 minutes and 31 seconds.

The time delay since the reference time $T_0$ is for example calculated by the content server 106 based on known viewing information from the user device 102. For example, assuming that the user of device 102 submits a comment while viewing a television program, the current runtime of the television program on the device 102 at the time that the comment is received can be used to determine time $T_1$. In particular, the content server 106 receives and tracks video viewing actions, such as starts, stops, and the addition of new feeds. In this way, the current runtime with respect to the reference of the video can be determined.

Alternatively, assuming that the user of device 102 is attending a live event, the time $T_1$ can be calculated based on the time when the media content is received by the content server 106, and the known reference time at the live event. Thus the server controls the timing, by determining both the reference time and the time stamp assigned to the media. For example, assuming that the reference time $T_0$ is the referees whistle at the start of a football match at 03:01:00 pm, and the comment is received at 03:16:31 pm, then the time T1 can be calculated as being equal to 00:15:31.

Then, a time period $T_2$ after the reference time another user USER2 submits an image, for example in response to an event EVENT2. For example, this event could be a second goal at a football match, the image being a photo of the goal taken using the user device of USER2.

Then, a time period $T_3$ after the reference time, another user USER3 submits a comment.

A user of user device 104 requests to start viewing the video stream 202 a delay $T_D$ after the start. For example, the user arrives home late after kick-off of a football match, and wishes to view the match from the start. Furthermore, the user has opted to receive feeds from friends or other users during viewing of the video stream.

A few minutes into the delayed video stream, the USER1 comment may be submitted. However, rather than this comment being provided as a feed and directly displayed on the user device 104, it is delayed until the time instant in the video stream 204 that the comment occurred, in other words by the time delay $T_D$. This therefore prevents the comment arriving before EVENT1 in the delayed video stream, which would be a spoiler, informing the user of device 104 of the event before it has been seen in the delayed version of the video stream. For example, the content server 106 waits until the time stamp of the media content matches the current runtime of the delayed video stream. In particular, the user device 104 for example periodically transmits to the server 106 a timing value, indicating for example the runtime of the video stream, and the server responds by providing the feeds that are relevant up to that moment of the video stream.

A few minutes later, the user of device 104 then opts to pause the video stream playback for a time $T_P$. Upon resumed playback of the video stream, the total delay time between the original video stream 202 and the delayed stream 204 is now $T_D+T_P$. Thus the image submitted by USER2 and the comment submitted by USER3 will only be fed to user device 104 after a delay of $T_D+T_P$. It is not necessary that the content server 106 determines this delay, as instead, as described above, the content server may determine or be informed of the current runtime of the video stream that takes into account all actions, including pauses, fast-forwards etc., such that the media content is transmitted at the appropriate time.

Figure 3:
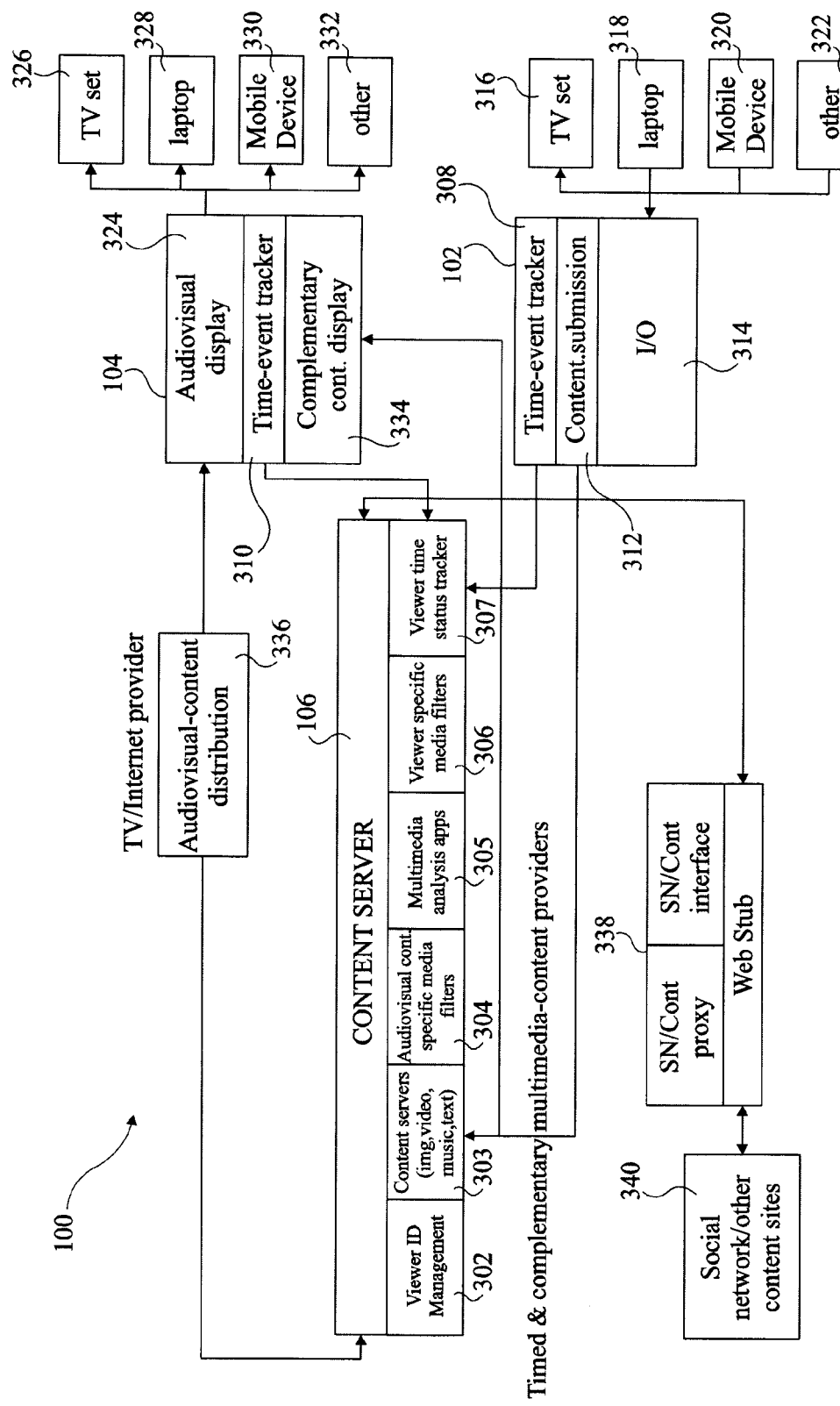
FIG. 3 illustrates the delayed video viewing system of FIG. 1 in more detail according to one embodiment.

FIG. 3 illustrates the delayed video viewing system of FIG. 1 in more detail according to one example, including the content server 106 and user devices 102 and 104.

The content server 106 comprises a number of functional modules 302 to 307, each of which is for example implemented by a combination of software and dedicated hardware elements, or entirely in software executed by a computer.

Module 302 provides viewer ID management, in particular allowing users to be identified. In some cases, users may be recognized directly from an identifier of their user device, while in other cases more than one user may share a user device, in which case users for example sign into the system in order to identify themselves.

Module 303 is a media content server that stores the media submitted by users, such as images, video, music or other sound clips, or text.

Module 304 comprises general audiovisual filters applied to the media of the content servers, which for example can be arranged to automatically filter out certain types of content from the media, such as offensive words from comments, or personal data.

Module 305 comprises a set of media content analysis algorithms and techniques that can be exploited by the system to improve the way in which the audiovisual content is managed. For example, this could range from improved media searching to improved audiovisual event summaries and indexing.

Module 306 provides viewer specific media filters. For example, users may define a list of other users from whom they wish to receive feeds, and/or to whom they wish their feeds to be sent. It could also block certain feeds based on user parameters, such as feeds in which swear words occur.

Module 307 provides the function of a viewer time status tracker, which communicates with a time-event tracker module 308 of device 102 in order to determine the time periods between the reference time $T_0$ and any media content submitted by device 102, and thus calculates the time stamp to be associated with the media content. Furthermore, module 307 communicates with a time-event tracker module 310 of device 104 in order to determine when the media content should be transmitted to device 104.

User device 102 also comprises a content transmission module 312, via which content is submitted by device 102 to the content server 106, and in particular to the content server module 303. Furthermore, device 102 comprises an input/output module 314 allowing communication with a number of devices such as a television set 316, laptop 318, mobile device 320, or other device 322, on which video streams may be displayed and media content generated.

User device 104 comprises a main audiovisual display module 324, which provides the delayed video stream to one or more of a number of display devices including a television set 326, laptop computer 328, mobile device 330, or other device 332. User device 104 further comprises a complementary content display module 334, which for example manages the display of feeds from the content server 106 on display of one or more of the devices 326 to 332.

The video streams for delayed viewing on the user device 104 are for example provided by an audiovisual-content distribution server 336, which for example forms part of the content server 106, or could be separate. The server 336 for example also provides certain information regarding the video streams, such as, for example, an identifier, duration indication and other such information, to the content server 106.

A social network contents server 338 also provides an interface between social network sites 340 such as Facebook or Twitter and the content server 106. In particular, it allows a user known to the content server 106, such as the user of device 102, to submit comments or other media content via a social network in relation to a video stream, such that they are transmitted to other users seeing the video stream via the content server 106. The social network Web Stub comprises two modules: the content proxy and the content interface. The content proxy enables content generated by the system to be fed to the social network using communications mechanisms defined by the social networks, using the latest Web mechanisms. The content interface ensures that the appearance and format (size, bit rate, etc.) of the media feed generated by the system are compatible with the social network feed display system.

Figure 4:
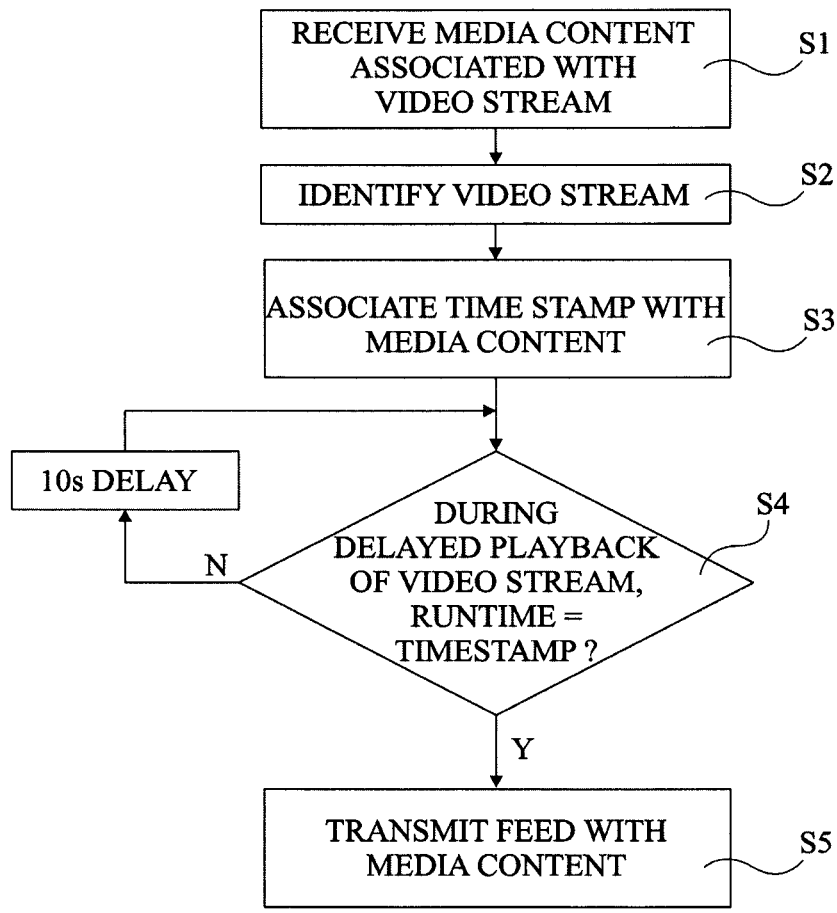
FIG. 4 is a flow diagram showing steps in a method of delayed video viewing according to an embodiment of the present disclosure.

FIG. 4 is a flow diagram illustrating steps in a method of delayed video viewing.

In a first step S1, media content associated with a video stream is received by a content server. As explained above, the media content is not necessarily submitted by a user viewing the video stream, but could be submitted by a user viewing a live event, which is being recorded to generate a video stream.

In a next step S2, the corresponding video stream is identified. For example, in the case that the user who submitted the media content is viewing a video stream supplied by the content server or another server, information identifying the program transmission may be obtained by the content server and stored in association with the media content, or simply be supplied by the user device when supplying the media content.

Alternatively, in the case that the user is attending a live event, location data of the user is for example submitted with the media content. The location data could be automatically provided from a positioning system in the user device, such as, for example, a GPS receiver. The content server may then automatically determine a corresponding video stream based on the location data. For example, the location data is compared with one or more known locations where video streams are generated or played, such as football stadiums, cinemas, concert halls etc. If a location of the user device matches a known location, the media content can then be associated with the video stream corresponding to that location.

In a next step S3, a time stamp is associated with the media content. In particular, the time that the media content is received by the content server is compared to a reference time associated with the video stream to determine the time stamp.

In a next step S4, during the delayed playback of the corresponding video stream on another device, it is determined whether or not the runtime of the video stream matches or is after the time stamp of the media content. In particular, the runtime of the video stream is for example periodically supplied by the user device performing the delayed playback, or is periodically determined by the content server, and the media content is only transmitted to the user device when the runtime is at least equal to the time stamp. If not, step S3 is repeated, for example after a 10 second delay or a different delay time depending on how often new runtime information becomes available. Alternatively, S3 could be repeated automatically as soon as new runtime information is received from the user device. When the runtime matches or exceeds the time stamp, the next step is S5.

In S5, the media content is transmitted to the user device via which the delayed video stream is being played.

A feature of the embodiments described herein is that media content may be accurately synchronised with video streams, and thus provided as feeds during delayed playback at appropriate times.

While a number of particular embodiments have been described, it will be apparent to those skilled in the art that numerous modifications may be applied.

For example, while examples of the task performed by the content server and the user devices have been provided, other solutions are possible. As an example, the time stamp could be determined by the user device submitting the media content, and transmitted to the content server with the media content. Furthermore, the media content and time stamp could be transmitted to the user device via which the delayed playback of the video stream is performed, the user device comparing the runtime of the video stream with the time stamp of the media content in order to automatically control the display of the feed containing the media content at the appropriate time.

Furthermore it will be apparent to those skilled in the art that the various features described in relation to the various embodiments could be combined in any combination in alternative embodiments of the disclosure.

The invention claimed is:

1. A method of playback of a video stream, the method comprising:
   receiving, by a server device and from a first user device, first media content associated with the video stream;
   determining, by the server device and based on receiving the first media content, a reference time associated with a start of the video stream;
   generating, by the server device, a time stamp indicating a time at which the first media content is received with respect to the reference time associated with the start of the video stream;
   determining, by the server device, that a second user device is providing the video stream for display;
   determining, by the server device, a current runtime of the video stream;
   determining, by the server device and based on the time stamp, that the current runtime of the video stream corresponds to the time at which the first media content was received with respect to the reference time associated with the start of the video stream; and
   providing, by the server device and to the second user device, the first media content for display by the second user device based on the current runtime of the video stream corresponding to the time at which the first media content was received with respect to the reference time associated with the start of the video stream.

2. The method of claim 1, where receiving the first media content includes:
   receiving, during a playback of the video stream on the first user device, the first media content.

3. The method of claim 1, where the first media content relates to a live event, the method further comprising:
   recording the live event to generate the video stream;
   where receiving the first media content includes:
      receiving the first media content during the recording of the live event; and
   where determining the reference time includes:
      determining a known time reference during the live event, and
      determining the reference time based on the known time reference.

4. The method of claim 1, where determining the current runtime of the video stream includes:
   receiving a control signal from the second user device, and
   determining current runtime of the video stream based on the control signal.

5. The method of claim 1, where the video stream is provided for display on a first display associated with the second user device and the first media content is provided for display on a second display associated with the second user device, the second display being different from the first display.

6. The method of claim 1, where the video stream and the first media content are provided for display on a same display of the second user device.

7. The method of claim 1, further comprising:
   determining, based on information included in the first media content, that the first media content is associated with the video stream.

8. The method of claim 7, where the video stream is associated with a live event and the first media content includes information identifying a location of the first user device; and
   where determining that the first media content is associated with the video stream includes:
      determining that the location of the first user device is associated with a location of the live event, and
      determining that the first media content is associated with the video stream based on the location of the first user device being associated with the location of the live event.

9. The method of claim 1, where the first media content includes at least one of:
   one or more comments entered via the first user device;
   one or more images captured by the first user device, or
   one or more sounds captured by the first user device.

10. The method of claim 1, where receiving the first media content includes:
    receiving a comment entered on a social networking website via the first user device.

11. The method of claim 1, where determining the current runtime of the video stream includes:
    receiving, from the second user device, a request for media content,
    the request for media content including information identifying the current runtime of the video stream.

12. A content server comprising:
    a processor to:
      receive, from a first user device, first media content associated with a video stream;
      determine, based on receiving the first media content, a reference time associated with a start of the video stream;
      generate a time stamp indicating a time at which the first media content is received with respect to the reference time associated with the start of the video stream;
      determine that a second user device is providing the video stream for display;
      determine a current runtime of the video stream;
      determine, based on the time stamp, that the current runtime of the video stream corresponds to the time at which the first media content was received with respect to the reference time; and
      transmit the first media content for display by the second user device based on the current runtime of the video stream corresponding to the time at which the first media content was received with respect to the reference time associated with the start of the video stream.

13. The content server of claim 12, where, when determining the current runtime, the processor is to:
    receive, prior to transmitting the first media content, a request, from the second user device, for media content,
    the request for the media content including information identifying the current runtime of the video stream on the second user device.

14. A system comprising:
    one or more devices to:
      generate a video stream;
      receive, during the generation of the video stream, media content from a first user device;
      determine, based on receiving the media content, a reference time associated with a start of the video stream;
      generate a time stamp indicating a time at which the media content is received with respect to the reference time associated with the start of the video stream;
      determine that a second user device is providing the video stream for display;
      determine a current runtime of the video stream;
      determine, based on the time stamp, that the current runtime of the video stream corresponds to the time at which the media content was received with respect to the reference time associated with the start of the video stream; and
      provide, to the second user device, the media content for display by the second user device based on the current runtime of the video stream corresponding to the time at which the media content was received with respect to the reference time associated with the start of the video stream.

15. The system of claim 14, where, when generating the video stream, the one or more devices are to:
    record a live event, and
    generate the video stream based on recording the live event;
    where, when receiving the media content, the one or more devices are to:
      receive the media content during the recording of the live event; and
    where, when determining the reference time, the one or more devices are to:
      determine a known time reference associated with the live event, and
      determine the reference time based on the known time reference.

16. The system of claim 15, where the known time reference includes one of:
    a starting time of the live event, or
    an occurrence of an action indicating a beginning of the live event.

17. The system of claim 14, where, when determining the reference time, the one or more devices are to:
    determine a transmission delay associated with a transmission of the media content from the first user device to the device, and
    determine the reference time further based on the transmission delay.

18. The system of claim 14, where, when receiving the media content, the one or more devices are to:
    receive an image captured via the first user device during a live event; and
    where, when providing the media content, the one or more devices are to:
      provide the image to the second user device.

19. The system of claim 14, where the one or more devices are further to:
    determine, based on information included in the media content, that the media content is associated with the video stream.

20. The system of claim 19, where the media content includes information identifying a location of the first user device; and
    where, when determining that the media content is associated with the video stream, the one or more devices are to:
      determine that the location of the first user device is associated with a location of a live event, and
      determine that the media content is associated with the video stream based on the location of the first user device being associated with the location of the live event.

* * * * *